UNITED STATES PATENT OFFICE.

WALTER EDWIN WINDSOR RICHARDS, OF LONDON, ENGLAND, ASSIGNOR TO THE BOURNE RUBBER COMPANY, LIMITED, OF LONDON, ENGLAND.

PROCESS FOR TREATING WORN OR WASTE RUBBER OR THE LIKE FOR THE UTILIZATION THEREOF.

1,053,439. Specification of Letters Patent. Patented Feb. 18, 1913.

No Drawing. Application filed December 4, 1911. Serial No. 663,773.

*To all whom it may concern:*

Be it known that I, WALTER EDWIN WINDSOR RICHARDS, mining engineer, a subject of the King of Great Britain, residing at 50 Great Tower street, London, England, have invented a certain New or Improved Process for Treating Worn or Waste Rubber or the Like for the Utilization Thereof, of which the following is a specification.

This invention has for its object the utilization of old, worn, or waste rubber or the like such as old rubber tires or tire covers for motor or other wheels; and is especially applicable for treating old, worn, or waste vulcanized rubber.

In the treatment, according to this invention of such old, worn, or waste rubber or the like, (hereinafter referred to as "waste rubber") I may form a permanent mixture of other substance or substances with such waste rubber and I may mold and vulcanize this waste rubber or the aforesaid mixture or composition (of waste rubber and other substances) into any suitable article or shape which after being vulcanized will become very hard when cold and set or after first treating this waste rubber in accordance with this invention I may then (either alone or mixed with other substance or substances) first vulcanize same and re-heat same until the mass assumes a granular or subdivided form and thereafter mold (either hot or cold) and press the material thus formed; or according to a further modification I may, after treating the waste rubber according to this invention remove the mass to mixing rolls or the like and then incorporate new rubber therewith and thereafter mold and vulcanize in usual manner or vulcanize before molding.

In carrying out the present invention, I take the waste rubber (such for example as old motor tires or old vulcanized rubber goods) irrespective of whether it contains or has mixed therewith any foreign substance or substances such as canvas (in the case of old motor tires) or dirt; and I subdivide or disintegrate same as required for example I may cut or tear same up into pieces, or I may grind or otherwise reduce same to a powder or finely divided condition; and I subject the mass to a suitable high temperature in any suitable manner namely to such a temperature and for such a time that the waste rubber will be fused or melted and such high temperature I have found to be about 300° C. but I do not confine myself thereto; and this heating may advantageously be effected while agitating stirring or mixing the material in a mixing machine (of any suitable type) until the whole mass is more or less homogeneous.

I may introduce and mix with the waste rubber either (*a*) before, or (*b*) during or (*c*) after, heating up the said waste rubber to its fusing or melting point as aforesaid any suitable substance or substances to serve as filling or strengthening material or otherwise; for example in cases where it is desired to form a hard substance I may use a mixture of waste rubber and asbestos, as follows:—Either before during or after fusing or melting the waste rubber under considerable heat as aforesaid, I mix asbestos (in a finely divided state therewith) and after the mass has been brought to a homogeneous state, this plastic mass (advantageously after being allowed to cool down somewhat) has sulfur mixed therewith and thereafter (*a*) this mixture is removed from the mixing machine and molded or otherwise formed into the desired shape or form and vulcanized; or (*b*) this mixture (plastic mass) is removed to suitable rubber mixing machinery such as the well-known rubber mixing rolls where new rubber is mixed and incorporated therewith after which this mixture is molded and vulcanized or (*c*) before removal from the mixing machine the temperature of the mass may be raised say to a vulcanizing temperature or to such a temperature while the mass is still in the mixing machine that same will finally assume a hard granular form after which it is taken out of the mixing machine and molded in hot molds to the shape or form required. This last-named method has the advantage that the articles can be pressed or molded and released from the mold immediately and moreover leave the mold with a high polish; and furthermore this method avoids the necessity of any separate vulcanizing machinery. When the waste rubber is fused or melted under considerable heat as aforesaid (either with or without previous admixture with asbestos or any other suitable heat resisting solid it will be found that it (particularly waste vulcanized rubber) has, or has acquired, the property of solubility in benzol or other rubber solvent.

The following are examples of the manner of working the process according to the present invention:—The rubber waste is well stirred in a suitable mixing and heating machine such for example as the well-known Werner-Pfleiderer machine (either with or without any added substance or substances such for example as asbestos) the heat being raised and maintained until the rubber has fused or melted, and the whole has become a plastic sticky mass. The heat is then allowed to drop a little to such a temperature that sulfur can be added and the sulfur is then added and well mixed into the rubber (and asbestos—if used). The quantity of sulfur depends on the class of article to be produced for example I may add from say 4% or 5% (by weight) up to say 25% of sulfur to the amount of rubber present in the mass. After adding the sulfur the heat is applied again and the temperature of the mass raised again and a change begins to then take place in the mass in the mixer viz. the mass begins to lose its sticky nature and becomes drier, (apparently becoming vulcanized; and in the case of already vulcanized rubber waste same apparently becomes revulcanized) other changes are also taking place; the compact mass being broken up into minute particles i. e. the mass finally assumes a hard granular form which is most convenient for the working or molding of the goods afterward. This granular material is taken from the machine, and either in a hot or cold state can be pressed in molds, which may be hot molds, and the finished article taken out. After the sulfur has been added to the fused waste rubber a variation may be employed by now taking the plastic mass out of the machine and rolling it into plates or molding it into any convenient forms or shape after which it is transferred to an ordinary vulcanizer and there vulcanized under known conditions. Articles made in this way have remarkable properties. Articles which have a certain amount of resiliency may be made by adding only a small quantity of sulfur to the fused mass and vulcanizing for a short time.

According to another modification; after fusing or melting the waste rubber, the plastic mass thus formed may have new rubber mixed therewith in any suitable manner as for example the said plastic mass—either with or without the addition of any filling substance such as asbestos—may be removed from the heating machine to mixing apparatus of any suitable type such as mixing rolls of the well-known type and there mixed and incorporated with new rubber (a suitable proportion of sulfur being mixed therewith) after which this mixture is then molded and vulcanized or finished in any suitable manner.

What I claim is:—

1. The herein described method of treating waste rubber which consists in heating same under agitation to a temperature such that the rubber will be fused or melted next reducing the temperature and then adding sulfur; mixing a filling or strengthening substance e. g. asbestos with the mass, next raising the temperature of the mass until same finally assumes a hard granular form; and then molding same into the desired shapes or articles substantially as and for the purposes described.

2. The herein described method of treating waste rubber which consists in heating same under agitation to a temperature of about 300° C. so that the rubber will be fused or melted, next reducing the temperature of the mass and then adding sulfur, mixing a filling or strengthening substance e. g. asbestos with the mass, next raising the temperature of the mass until same finally assumes a hard granular form; and then molding same into the desired shapes or articles substantially as and for the purposes described.

In witness whereof I have hereunto set my hand in presence of two witnesses.

WALTER EDWIN WINDSOR RICHARDS.

Witnesses:
G. GANDER,
H. D. JAMESON.